G. B. READ.
ELEVATOR.
APPLICATION FILED APR. 13, 1914.
Reissued Mar. 28, 1916.
14,097.
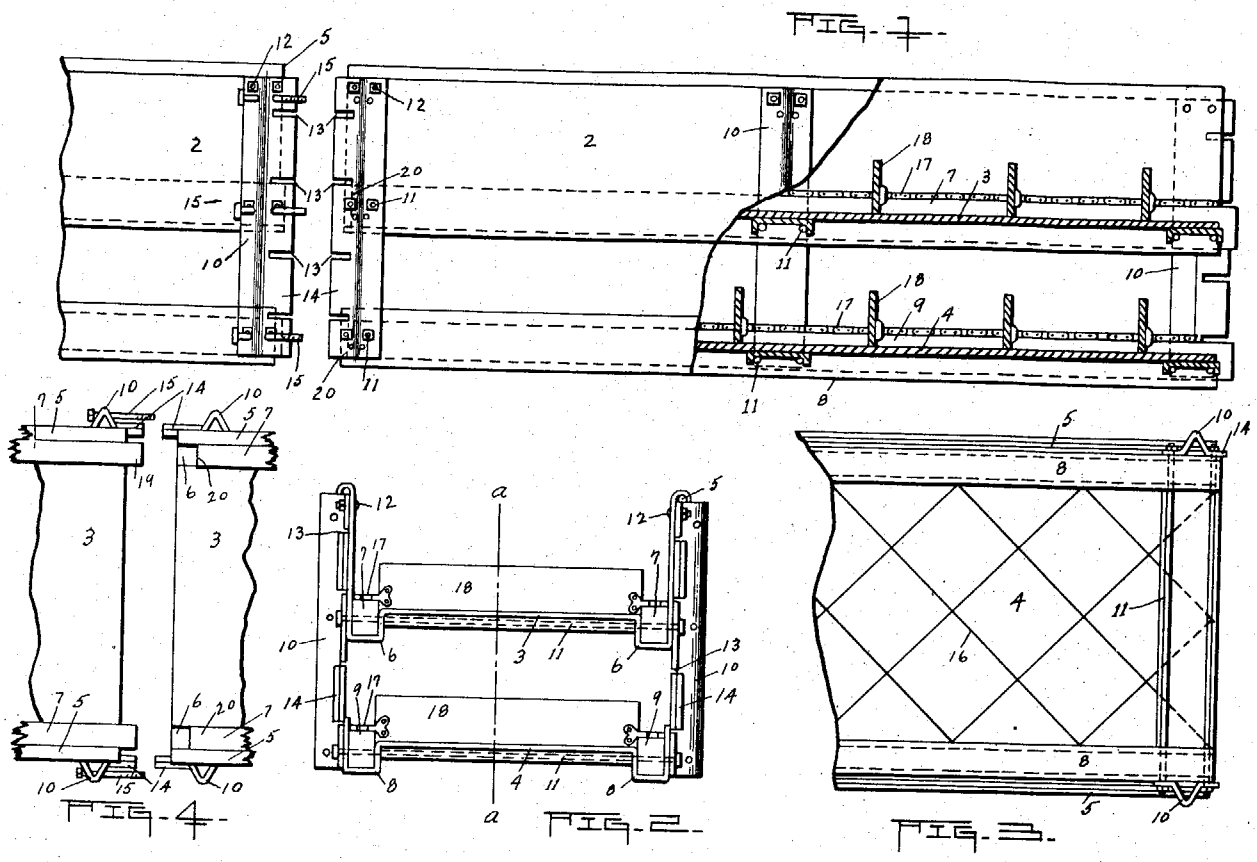
INVENTOR.
Geo. B. Read
BY
W. V. Tuttle
ATT'Y.
THE COLUMBIA PLANOGRAPH CO., WASHINGTON, D. C.

UNITED STATES PATENT OFFICE.

GEORGE B. READ, OF BLOOMINGTON, ILLINOIS.

ELEVATOR.

14,097. Specification of Reissued Letters Patent. Reissued Mar. 28, 1916.

Original No. 1,082,908, dated December 30, 1913, Serial No. 665,919. Application for reissue filed April 13, 1914. Serial No. 831,668.

*To all whom it may concern:*

Be it known that I, GEORGE B. READ, a citizen of the United States, residing at Bloomington, in the county of McLean and State of Illinois, have invented new and useful Improvements in Elevators, of which the following is a specification.

This invention has reference more particularly to elevators which are constructed of sheet metal.

The object of my invention is to provide an elevator made up of sections in which means are provided for joining the sections whereby the sections are drawn and held in perfect alinement.

Another object of the invention is the provision of means for thoroughly bracing the side walls of the elevator.

Another object of the invention is the provision of means for bracing and spacing the side members of the elevator, such bracing and spacing means being located directly under the bottom of the elevator so as to provide a support therefor.

Another object of the invention is the construction of the elevator bottom with grooves or corrugations for strengthening the elevator.

A further object of the invention is the provision of fibrous or non-metallic members which support and confine the conveyer elements in their movement and absorb the sound resulting from movement thereof, thereby preventing the large amount of noise which is usually present in metal elevators.

Referring to the drawings, Figure 1 is a side elevation showing one full section and the end portion of an adjoining section, the full section being made sectional on the line *a—a* of Fig. 2; Fig. 2 is an end view of one of the sections; Fig. 3 is a plan view of the bottom portion of a section showing the corrugated formations of the same; and Fig. 4 is an enlarged top view of portions of two adjoining sections.

In the drawings, 2 refers generally to the elevator sections; 3 refers generally to the elevator trough.

4 refers generally to the transverse bottom portion of the conveyer and is properly spaced apart from the conveyer trough to provide space within which the return flights are carried.

Parts 3 and 4 are designed to be formed of sheet metal. The upper edges of trough 3 are adapted to be turned from a vertical line and in substantially the same manner as at 5 for the purpose of reinforcing the upper edges thereof. The complete sectional trough may be formed out of a single piece of sheet metal, the same being shaped substantially in rectangular form with the lower longitudinal corners thereof having the angular offsets or channels 6, said channels running the full length of each section, the channels of each section adapted when the sections are united to form continuous channels the entire length of the elevator. The channels 6 thus formed in sections, strengthen the same, especially against transverse strains, and effect a reinforcement of the metal sections.

7 are wood strips which are set into the channels 6 and are secured therein for the purpose of reinforcing the metals sections of the elevator. These strips are arranged so that, at one end of each section, they extend somewhat beyond the end of the section as shown at 19, and at the opposite end of the section they terminate a corresponding distance from the end as at 20. This construction is provided, in each section, that when the ends of two sections are brought together, one having the strips extended and one having the strips terminating at a distance from the end, the extended ends 19 of the strip 7 will be inserted into the channel 6 and hold the sections of the elevator in perfect alinement. These strips 7 are designed to support the chains 17 in their travel and the relation of the joining ends of the strips 7 is such, that the bolts 15 draw the adjacent strips 7 into very close contact so as to provide a smooth uninterrupted support for the chains 17. These chains which are located, one at each side of the elevator, have the flights 18 connected therebetween and the wood strips 7 are of sufficient height to support the chains 17 and the flights 18, and these strips also engage the ends of the flights 18 thereby preventing noisy contact with metal parts of the elevator during operation.

The transverse bottom portion 4 is designed to be of sheet metal and has the downwardly, laterally, and upwardly turned portions forming the channel portions, 8, such channel formations serving the same functional purpose as described in connection with channels 6 of trough 3.

9—9 are wooden strips or bars set into and extending the length of channels 8, serving the same functional purpose ascribed to bars 7 of trough 3.

10 are channel plates adapted to connect trough 3 and the transverse bottom portion 4, and are connected to the said trough and transverse bottom portions, and likewise opposite channel portions 10 by means of rods as 11, as best illustrated in Figs. 2 and 3, and by means of bolts 12 connecting the channel portions with the trough portion. The channel plates 10 serve as reinforcement against transverse, torsional, and other strains that would tend to destroy the desired rectangular lines of elevator formation that is desirable and necessary to effect the best results. As many such channel portions 10 may be employed as are found necessary to properly strengthen the sections. The outer edges of the channel plates of each section are serrated as at 13 and contiguous edges of each plate are bent outwardly from a normal vertical plane so that they bear relatively a staggered relation (as best shown in Fig. 2). I have designated these staggered portions as 14. The staggered portions of end channel plates 10 upon the meeting ends of sections are bent, each matching relatively in opposite directions so that when the sections are brought together, they will pass to a contact, the outer edges of each staggered portion with the inclined face of the body of the contiguous section, thus serving when the sections are united, as by means of the bolts 15 engaging perforations of the respective end channel plates, to form a contiguous interlock throughout the length of said channel plates, serving to reinforce the bolt connections and the elevator as a whole against transverse, torsional or other strains. Also, by means of the staggered relation of the connected channel plates and the angular disposition of the same, any lost motion or looseness between the sections may be readily taken up through and by means of the bolts 15 drawing the staggered parts into close contact.

In the main figures illustrative of the structure of the sections, I have shown the metal bottom portions respectively of the trough portion 3 and the transverse portion 4 as of plain, flat metal, but in practice I may desire to corrugate these bottom portions, as shown at 16 in Fig. 3, either in straight corrugations or in herringbone style, the purpose of such corrugated formation being to stiffen or reinforce the metal of the elevator sections.

What I claim is:

1. In a device of the class described the combination of a conveyer comprising a bottom and side walls, a longitudinally recessed portion at each side of the bottom adjacent the side walls, a longitudinal reinforcing strip in each recess, a spacer below the bottom and intermediate of the recessed portion for maintaining the proper separation of the side walls of the conveyer, and bolts extending transversely of the conveyer through the recessed portions, reinforcing strips and side walls and adapted to clamp the reinforcing strip between the side walls of the conveyer and the spacer.

2. In a device of the class described the combination of a conveyer comprising a bottom and side walls, a longitudinally recessed portion at each side of the bottom adjacent the side walls, a return bottom below the conveyer, braces connected to the side wall of the conveyer for securing the return bottom to the conveyer, and bolts extending transversely of the conveyer through the recessed portions of the bottom and the braces.

3. In a device of the class described the combination of a conveyer comprising a bottom and side walls, a longitudinally recessed portion at each side of the bottom adjacent the side walls, a reinforcing strip in each recess, a return bottom beneath the conveyer, a brace secured to each side wall of the conveyer for connecting the return bottom to the conveyer, a bolt extending transversely under the conveyer bottom and through the longitudinal recessed portion, the reinforcing strips and the said braces, and a spacer adjacent the said bolt intermediate of the recessed portions of the bottom.

4. In a device of the class described the combination of a plurality of conveyer sections each having a bottom and side walls, a longitudinal recess at each side of the bottom and adjacent the side walls in each section, longitudinal strips in said recesses in one of said sections terminating at a distance from the end of said section, and longitudinal strips in the recesses of the abutting section extending beyond the end thereof into the recesses of the first mentioned section.

5. In a device of the class described the combination of a plurality of conveyer sections each having a bottom and side walls, strips at each side of the bottom of each section and adjacent the side walls for supporting the conveyer element, means on each abutting section extending beyond the end thereof for engagement with portions of the abutting section, and recessed parts on each section adapted to receive the extending portions of the abutting section.

6. An elevator body, comprising in combination, sheet metal trough and return members and means for spacing said members apart, each of said members consisting of a bottom portion, longitudinal channels formed on each edge thereof by downwardly, outwardly and upwardly bending the edge portions of each member, and filling blocks fitted to said longitudinal channels to entirely fill the same and project above the tops thereof, said upwardly turned portions of the channels forming exterior walls of the trough and return members.

7. An elevator body, comprising in combination, sheet metal trough and return members, and means for spacing said members apart, each of said members consisting of a bottom portion, longitudinal channels formed on each edge thereof by downwardly, outwardly and upwardly bending the edge portions of each member, filling blocks fitted to said longitudinal channels to entirely fill the same and project above the tops thereof, and transverse bolts extending through said spacing means, downwardly and upwardly turned portions, and said filling blocks, whereby to form a unitary structure.

GEO. B. READ.

Witnesses:
L. F. LEDDERBOGE,
LOUISE H. CALLAHAN.

Copies of this patent may be obtained for five cents each, by addressing the "Commissioner of Patents, Washington, D. C."